(12) United States Patent
Voyer et al.

(10) Patent No.: US 7,096,485 B2
(45) Date of Patent: Aug. 22, 2006

(54) METHOD AND APPARATUS FOR FILTERING DATA CONCERNING AN ELECTRONIC PROGRAM GUIDE FOR A TELEVISION RECEIVER

(75) Inventors: Pascal Voyer, Aix en Provence (FR); Marc Mondeteguy, Luynes (FR)

(73) Assignee: STMicroelectronics SA, Montrouge (FR)

( * ) Notice: Subject to any disclaimer, the term of this patent is extended or adjusted under 35 U.S.C. 154(b) by 1154 days.

(21) Appl. No.: 10/037,305

(22) Filed: Dec. 21, 2001

(65) Prior Publication Data

US 2002/0092020 A1 Jul. 11, 2002

(30) Foreign Application Priority Data

Dec. 22, 2000 (FR) .................................. 00 16873

(51) Int. Cl.
*G06F 13/00* (2006.01)
(52) U.S. Cl. .............................. 725/54; 725/38; 725/40; 725/50
(58) Field of Classification Search ............ 725/49–50, 725/54, 38–40, 47
See application file for complete search history.

(56) References Cited

U.S. PATENT DOCUMENTS 5,459,522 A * 10/1995 Pint ............................ 348/478
5,548,338 A * 8/1996 Ellis et al. ..................... 725/54
5,608,534 A * 3/1997 Park et al. ..................... 386/83
5,917,481 A 6/1999 Rzeszewski et al.
6,401,242 B1 * 6/2002 Eyer et al. ..................... 725/35
6,483,547 B1 * 11/2002 Eyer ........................... 348/473

OTHER PUBLICATIONS

ETSI: Sophia Antipolis; FR: ETS 300 707; "Electronic Programme Guide; Protocol for a TV Guide using Electronic Data Transmission" published by European Telecommunication Standard in May 1997, pp. 1-89.

* cited by examiner

*Primary Examiner*—Christopher Grant
*Assistant Examiner*—Chris Parry
(74) *Attorney, Agent, or Firm*—Lisa K. Jorgenson; Allen, Dyer, Doppelt, Milbrath & Gilchrist, P.A.

(57) ABSTRACT

The method of filtering data concerning an electronic program guide (EPG) in a television receiver having a device for automatically searching television channels includes supplying a list of CNI codes of all or some of the channels received by the television receiver to a memory. The method includes obtaining, from the SUMMARY of the guide, a MODIFIED SUMMARY containing only the information of the SUMMARY concerning all or some of the channels received by the television receiver, and recording only the data blocks of the CONTENTS of the guide in a memory when they correspond to all or some of the channels received by the television receiver.

17 Claims, 2 Drawing Sheets

METHOD AND APPARATUS FOR FILTERING DATA CONCERNING AN ELECTRONIC PROGRAM GUIDE FOR A TELEVISION RECEIVER

FIELD OF THE INVENTION

The invention generally relates to television receivers or sets, and more particularly to TV sets equipped with a device for receiving information or data concerning programs of channels and displaying them on the TV screen at the viewer's request.

BACKGROUND OF THE INVENTION

A TV image or video image includes two interlaced fields of lines, and the time interval which runs between the end of one field and the start of the next, referred to as the field flyback (or vertical flyback), is devoid of video signals. Accordingly, it has been proposed to use this field flyback to send information, for instance "teletext" information. It has been proposed to use these time intervals to send the programs of certain channels as well as to produce an electronic guide to the programs on these channels, known under the acronym EPG for Electronic Program Guide.

This electronic program guide is sent in two parts, SUMMARY and CONTENTS, the SUMMARY identifying each channel by a code CNI (for Country Network Identification) and indicating, for each channel, references or ID numbers identifying blocks of data whose contents relate to the program of the corresponding channel. These ID references are classed in an ascending order and identify, for example in the form of a pair of ID references, the first data block and the last data block allocated to a channel of the SUMMARY. This pair defines a series of identification numbers for each channel.

Presently in France, two channels propose such a guide not only for their own programs, but also for programs of other channels, for instance those in the French language. Such a service could moreover be supplied by each channel for other channels. To supply such a service, the TV set must be equipped with a device which includes a memory storing the information received during the field flyback and concerning the electronic program guide. This memory is then "managed" by programs and algorithms in view of presenting the information according to criteria defined by the viewer, e.g. the programs on a given channel, films shown on the channels at a given date, etc.

It has been determined that the size of the memory needed to record the program of a channel over one week is about 256 kilobytes, i.e. two to three megabytes for around ten channels. This size is without counting the microprocessor memory for processing the information in view of presenting it according to selected criteria. These figures show that the size of the memory limits the service which can be proposed to a TV viewer in that area.

SUMMARY OF THE INVENTION

An object of the present invention is, therefore, to implement a method and provide a device for filtering information received to retain only that which presents an interest to the TV viewer according to certain criteria, allowing an adaptation to the size of the memory.

The invention relates to method of filtering data concerning an electronic program guide in a television receiver and sent in the form of a SUMMARY and CONTENTS. The television receiver may comprise a device for automatically searching television channels and supplying a list of codes CNI for all or some of the channels received by the television receiver to a first memory. The method includes obtaining in a second memory, from the SUMMARY of the guide, a MODIFIED SUMMARY containing only the information of the SUMMARY concerning all or some of the channels received by the television receiver as identified in the first memory, and recording only the data blocks of the CONTENTS of the guide in a third memory when they correspond to all or some of the channels received by the television receiver.

Obtaining the MODIFIED SUMMARY may include recording the SUMMARY or a part thereof in a buffer memory, at each field flyback; comparing each code CNI of the SUMMARY with the list of codes CNI contained in the first memory; transferring the received code CNI and the identification numbers of the associated data blocks into the second memory only in the case of identity so as to create the MODIFIED SUMMARY; then processing the next code CNI or recording the SUMMARY. Recording data in the third memory may include recording at least one data block and its identification number ID in the buffer memory; comparing the identification number ID of the data block with the identification numbers ID recorded in the second memory; transferring the data block, its identification number ID as well as the corresponding code CNI into the third memory only in the case of identity; and processing the next identification number or recording the data block(s) of the next field.

The invention also relates to a device for filtering data concerning an electronic program guide (EPG) in a television receiver including a device for automatically searching channels and supplying a list of codes CNI of all or some of the channels received by the television receiver to a first memory. The device may also include a buffer memory for recording the information concerning the electronic program guide EPG received during a field flyback of the television image; and a third memory for recording, via the buffer memory, the information of the EPG guide. The device also includes a television screen for displaying the television pictures as well as information of the EPG guide, and a microcontroller for supplying command signals for commanding the buffer memory and the third memory.

Furthermore, the filtering device may comprise first comparison means for comparing each code CNI of the SUMMARY of the EPG guide with the list of codes CNI of all or some of the channels received by the television receiver, as recorded in the first memory; and means, controlled by the comparison means, for recording in a second memory the codes CNI of all or some of the received channels as well as numbers ID identifying the data blocks corresponding to each program of the received channels. A second comparison means compares each identification number ID of a received data block with the list of identification numbers recorded in the second memory. Means, commanded by the second comparison means, records the data blocks for which the identification numbers ID correspond to those recorded in the second memory as well as the code CNI of the channel and the identification number ID of the data block in the third memory.

BRIEF DESCRIPTION OF THE DRAWINGS

Other characteristics and advantages of the present invention shall become more apparent upon reading the following description of a preferred embodiment, given in conjunction with the appended drawings in which.

DETAILED DESCRIPTION OF THE PREFERRED EMBODIMENTS

Figure 1:
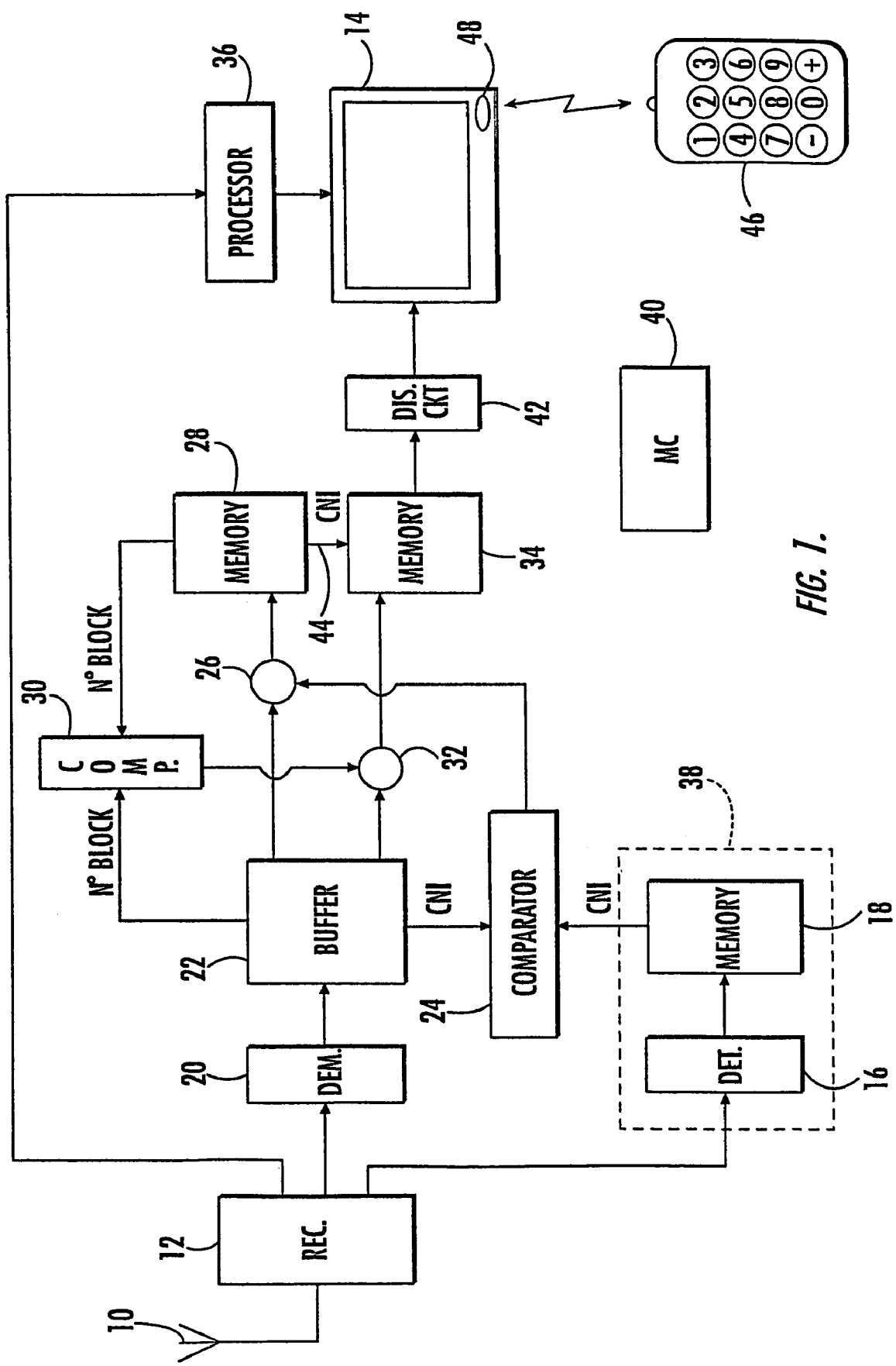
FIG. 1 is a simplified schematic diagram of a device for filtering television channel program data in accordance with the invention.

As discussed above, information concerning channel programs are sent during the field flyback to form the electronic program guide known under the acronym EPG. In Europe, the information is defined by the ETS 300-307/708 standard (ETS is the acronym for European Telecommunications Software). For the requirements of the present invention, the description of that standard shall be limited to those elements that are essential for its understanding.

The contents of an EPG guide comprise two parts: a first part referred to as "SUMMARY", and a second part referred to as "CONTENTS". The SUMMARY contains at least the CNI identification (CNI is the acronym for Country Network Identification) of the channels covered by the guide, each accompanied by two references or ID numbers which identify, in the CONTENTS part, the first and last data blocks whose data relate to the channel identified by the CNI code. These pairs of numbers of the first and last data blocks define a series of consecutive numbers. As a variant, the invention also applies to the case where all the identification numbers of the data blocks allocated to a channel are sent in the SUMMARY.

An EPG guide transmission first starts with the SUMMARY followed by the CONTENTS, this transmission being performed field after field at a rate of around 700 bytes at the most per field. Consequently, the transmission of the SUMMARY or a data block can use several field flybacks, which implies that there are also elements which identify each field flyback. In present-day EPG guide systems, the SUMMARY is recorded in a memory to serve as switching information for the data blocks in the CONTENTS and for allocating data blocks to the corresponding channels by comparing the number of a received data block with the pairs of numbers of first and last blocks accompanying the CNI code of each channel in the SUMMARY.

These data blocks are recorded when they are received in a memory by associating them with the corresponding CNI code so that programs and algorithms will make it possible to present the recorded data blocks on the television screen according to determined criteria. Note that the transmission of an EPG guide can take up several tens of minutes of transmission time. In view of the limited memory capacity, it may happen that the last received data blocks cannot be recorded even though the information they contain is of interest to the viewer.

In accordance with the invention, it is proposed to filter the received data blocks so as to record, according to certain criteria, only those that correspond to channels of interest to the viewer. One principle filtering criterion, in accordance with the invention, is to focus only on channels that are received by the TV set. Naturally, other criteria may be used, for instance the channels in a given language, so long as the channels are listed in the SUMMARY according to that criterion. However, this language criterion can be preceded or followed by the criterion of whether or not the channel is received by the TV set.

The criterion of whether or not a channel is received is easy to implement since this information is created upon the TV set being set up at the level of the viewer. Indeed, each TV set is equipped with an automatic channel searching device which, by scanning through the frequency spectrum, can automatically recognize the channels susceptible of being received at the TV set's geographical location and record their identification characteristics, including the CNI code. This operation is known as tuning. These identification characteristics are recorded in an EEPROM (electrically erasable programmable read-only memory) type semi-permanent memory.

In the simplified diagram of FIG. 1, the TV signal is detected by an antenna 10 and directed to a receiver 12. At the output of the receiver 12, a first signal is applied to a processor device 36 which displays the image on the screen or display 14. A second signal is applied to an automatic channel search device 38 which detects the channels via a circuit 16 and records the identification characteristics of these channels (CNI codes) in a first memory 18 mentioned above.

A third signal, which is the one transmitted during the field flyback, is applied to a demodulator circuit 20 which supplies binary codes in accordance with the above-mentioned standard. These binary codes are recorded in a buffer memory 22 whose capacity is such as to be able to record the maximum number bytes transmitted during a field flyback, i.e. around 700 bytes. At each new field flyback, a recording is made on the buffer memory 22 with the new binary codes received.

During the time interval between two successive fields, the contents of the buffer memory are to be processed in accordance with the characteristics of the inventive method, the latter being implemented by a microcontroller 40 MC whose signals command the elements assigned to the invention. The elements assigned to the implementation of the invention are, in addition to the microcontroller 40 MC and the buffer memory 22, a memory 28 (the second memory mentioned above) referred to as the MODIFIED SUMMARY memory, and a memory 34 (the third memory mentioned above) which forms the memory for displaying the guide on the screen 14 of the TV set, via a display circuit 42.

The device in accordance with the invention also comprises electronic transfer gates 26 and 32 for the transfer from the buffer memory 22 to memory 28 and memory 34, and comparators 24 and 30 which compare some of the codes contained in the buffer memory with corresponding codes contained in memories 18 and 28 as the case arises. The signals supplied by these comparators 24 and 30 respectively command the opening or the closing of the electronic gates 26 and 32. It is to be noted that comparators 24 and 30 can be implemented in software form using a sub-program of the microcontroller 40 MC, in which case the electronic gates 26 and 32 are controlled by the microcontroller. When the microcontroller detects an EPG guide SUMMARY in the buffer memory 22, it compares (comparator 24) each CNI code with those contained in memory 18. In case of identity of contents, the CNI code of the channel whose signal is received by the TV set is recorded in the second memory 28, schematically via the electronic gates 26 whose opening is controlled by the signal indicating identity at the comparator 24. This CNI code is accompanied by the pair of ID numbers of the first and last data blocks allocated to CONTENTS for the channel identified by the CNI code.

In the absence of identity, i.e. when the channel is not received, the CNI code corresponding to that channel and the pair of ID numbers of the first and last data blocks of CONTENTS are not transferred into memory 28. Further to this operation, after the EPG guide SUMMARY has been received, memory 28 will only contain the CNI codes and the pairs of ID numbers of the data blocks corresponding to channels whose signals can be detected by the TV set, i.e. those listed in memory 18. As a result, memory 28 contains a MODIFIED SUMMARY.

After having received the EPG guide SUMMARY, the TV set receives the guide CONTENTS in the form of data blocks identified by the ID numbers. These data blocks are recorded with their ID number in the buffer memory 22 as and when they are received field after field. After recording one or several data blocks corresponding to a field flyback, each data block ID number is compared in comparator 30 to the series of numbers of data blocks of the MODIFIED SUMMARY contained in memory 28.

In case of identity, comparator 30 supplies a signal that opens electronic gates 32 to transfer the data block from the buffer memory 22 to the memory 34 where it is assigned to the channel to which it corresponds, for example by associating it to the CNI code, as indicated by arrow 44 between memory 28 and memory 34. In the absence of identity between the number of a data block contained in the buffer memory 22 and one of the numbers of the series of numbers of the data blocks, the transfer of the data block to the memory 34 does not take place. These operations of comparing and transferring to memory 34 are performed under control of the microcontroller 40, the comparisons possibly being performed by the microcontroller as indicated above.

When all the EPG guide has been received and processed in accordance with the above description, memory 34 only contains program data concerning the channels identified by their CNI code recorded in memory 18, i.e. those which can be received. The data blocks contained in memory 34 can then be processed using programs and algorithms implemented in a known way by the controller 40 at the viewer's request using a remote controller 46 cooperating with a receiver 48 on the TV set 14. After processing, e.g. for obtaining films at a given date, the sorted information is presented on the screen of the TV set 14 via a display circuit 42 which is also controlled by the microcontroller 40. For clarity, FIG. 1 does not show the functional links from the controller 40 to the other elements of the device.

The description just given of the device in accordance with the invention and its operation makes it possible to define the different steps of a process which comprises two parts or main stages, the first one comprising the steps of processing the SUMMARY and the second comprising the steps of processing the CONTENTS.

For processing the SUMMARY, the steps include (FIG. 2): (a) recording (20) the SUMMARY or a part thereof in the buffer memory 22 at each field flyback, (b) comparing (24) a CNI code of the SUMMARY with the list of CNI codes contained in the first memory 18, (c) transferring (26) the received CNI code and the pairs of ID identification numbers of associated data blocks into the second memory 28 only in the case of identity so as to create a MODIFIED SUMMARY, and (d) returning to step (b) to process the following CNI code or to step (a) to record the SUMMARY.

Figure 3:
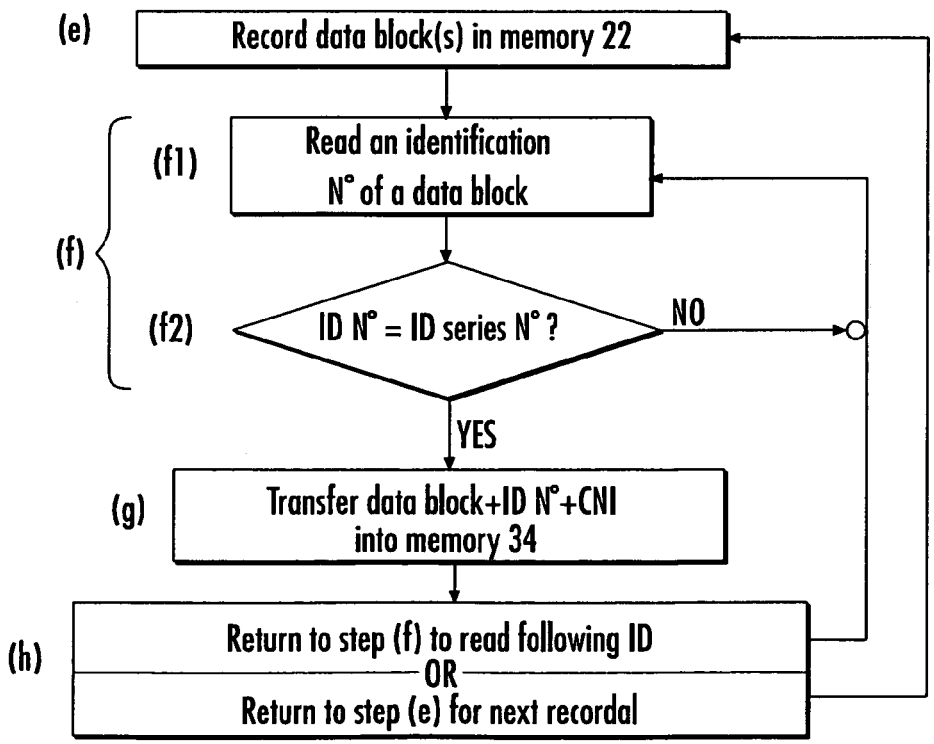
FIG. 3 is a flowchart showing the steps involved in processing EPG guide CONTENTS in accordance with the invention.

For processing the CONTENTS, the steps include (FIG. 3): (e) recording (20) at least one data block and its identification number ID in the buffer memory 22, (f) comparing (30) the identification number ID of the data block with the series defined by the pairs of identification numbers ID recorded in the second memory 28, (g) transferring the data block, its identification number as well as the corresponding CNI code into the third memory 34 only in case of identity, and (h) returning to step (f) to process the following identification number or to step (e) to record the data block(s) of the following field.

Figure 2:
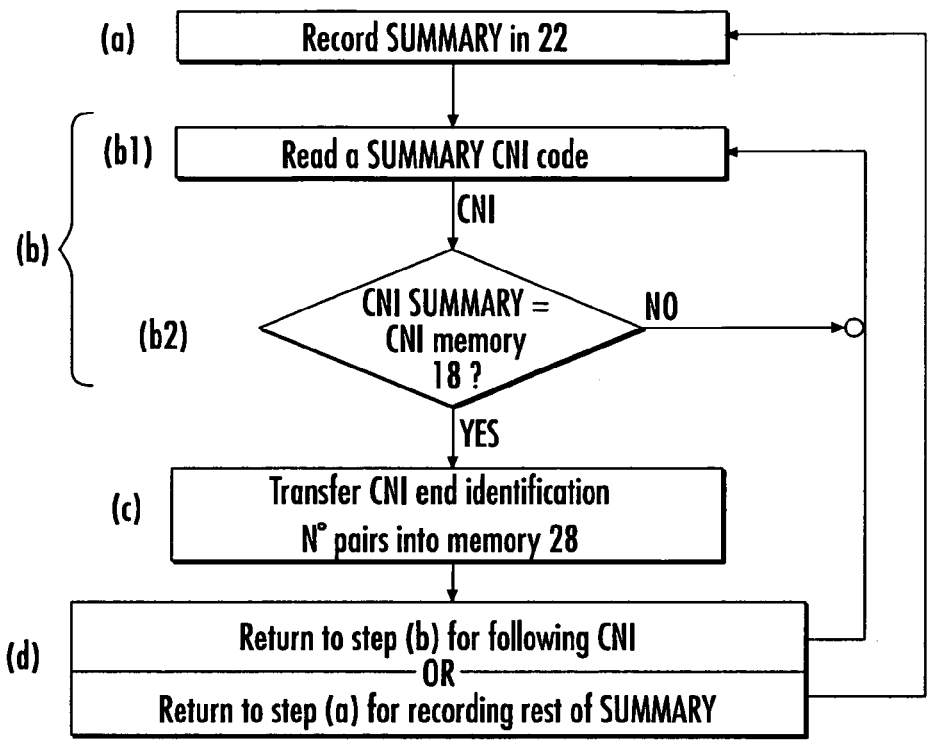
FIG. 2 is a flowchart showing the steps involved in processing an EPG guide SUMMARY in accordance with the invention.

In FIG. 2, step (b) has been represented as two sub-steps, one (b1) of reading a CNI code of the SUMMARY and the other (b2) of comparing that read code with the list of CNI codes contained in the first memory 18. In a similar way, in FIG. 3, step (f) has been represented as two sub-steps, one (f1) of reading an identification number ID of a data block contained in the buffer memory 22 and the other (f2) of comparing that number ID to the numbers of the series of data blocks defined by the SUMMARY.

The invention has been described in its application to a television receiver which comprises a circuit for automatically searching channels received and which supplies the CNI codes of the received channels into a memory 18. It also applies to a case where, among the received channels, the viewer limits himself/herself to some of them—those that interest him/her. In this case, the viewer has the possibility of only keeping the CNI codes of the channels he/she selects by acting on memory 18 via the remote controller 46 and the microcontroller 40. Such an approach also allows adaptation of the device of the invention to the size of the memory 34 by limiting the number of processed channels to 10, 20 or more channels.

That which is claimed is:

1. A method of filtering data for an electronic program guide (EPG) in a television receiver and sent in the form of a summary followed by contents, the summary indicating for each channel the code of the channel and identification numbers of data blocks sent with the contents, the television receiver comprising a device for searching television channels and storing a list of codes for all or some of the channels received by the television receiver to a first memory, the method comprising:
    (I) obtaining, from the summary, a modified summary containing only the data of the summary concerning all or some of the channels received by the television receiver as identified in the first memory, and storing the modified summary in a second memory; and
    (II) recording only data blocks of the contents of the guide in a third memory when they correspond to identification numbers of the modified summary contained in the second memory.

2. The method according to claim 1, wherein obtaining the modified summary comprises:
    (a) recording the summary or a part thereof in a buffer memory, at each field flyback;
    (b) comparing each code of the summary with the list of codes contained in the first memory; and
    (c) transferring codes and identification numbers of associated data blocks into the second memory based upon the comparison to create the modified summary.

3. A method according to claim 2, wherein comparing each code comprises:
    reading each code of the summary in the buffer memory; and
    comparing each code with the list of codes contained in the first memory.

4. A method according to claim 1, wherein recording data blocks of the contents of the guide in the third memory comprises:
    (e) recording at least one data block of the contents and its identification number in the buffer memory;
    (f) comparing the identification number of the data block recorded in the buffer memory with the identification numbers recorded in the second memory; and (g) transferring the data block, its identification number and the corresponding code into the third memory based upon the comparison.

5. A method according to claim 4, wherein comparing the identification number comprises:
reading the identification number of the data block contained in the buffer memory; and
comparing the identification number with the identification numbers of the modified summary recorded in the second memory.

6. A method according to claim 4, wherein the identification numbers associated to each code correspond to identification numbers of first and last identification numbers of a series of data blocks allocated to a channel; and wherein comparing the identification numbers comprises comparing the identification number of the received data block with each identification number of the series of data blocks allocated to a channel.

7. A method of filtering electronic program guide (EPG) data in a television receiver, the EPG data including a summary followed by contents, the summary indicating the code for each channel and identification numbers of data blocks of the contents, the method comprising:
searching television channels and storing codes for at least some of the channels received by the television receiver to a first memory;
generating, from the summary, a modified summary containing only the codes and identification numbers of the channels identified in the first memory;
storing the modified summary in a second memory; and
recording data blocks of the contents of the EPG data in a third memory when they correspond to identification numbers of the modified summary contained in the second memory.

8. The method according to claim 7, wherein generating the modified summary comprises:
recording at least part of the summary in a buffer memory;
comparing each code of the summary with the codes contained in the first memory; and
transferring codes and identification numbers of associated data blocks into the second memory based upon the comparison.

9. A method according to claim 8, wherein comparing each code comprises:
reading each code of the summary in the buffer memory; and
comparing each code with the codes contained in the first memory.

10. A method according to claim 7, wherein recording data blocks in the third memory comprises:
recording at least one data block of the contents and its identification number in the buffer memory;
comparing the identification number of the data block recorded in the buffer memory with the identification numbers recorded in the second memory; and
transferring the data block, its identification number and the corresponding code into the third memory based upon the comparison.

11. A method according to claim 10, wherein comparing the identification number comprises:
reading the identification number of the data block contained in the buffer memory; and
comparing the identification number with the identification numbers of the modified summary recorded in the second memory.

12. A device for filtering electronic program guide (EPG) data in a television receiver, the EPG data including a summary followed by contents, the summary indicating the code for each channel and identification numbers of data blocks of the contents, the device comprising:
a first memory;
a channel detection device for automatically searching channels and storing a list of codes of at least some of the channels received by the television receiver in the first memory;
a buffer memory for storing at least one data block of the contents and its identification number received during a field flyback of the television image;
a second memory for storing a modified summary;
a third memory for recording, via the buffer memory, the EPG data;
a display for displaying television images and EPG data;
a microcontroller for controlling the memories;
first comparison means for comparing each code of the summary with the list of codes recorded in the first memory;
first recording means, controlled by the first comparison means, for recording the modified summary containing only the codes and identification numbers of the channels identified in the first memory, in a second memory;
second comparison means for comparing the identification number of the data block recorded in the buffer memory with the identification numbers recorded in the second memory;
second recording means, controlled by the second comparison means, for recording data blocks of the contents of the EPG guide data in a third memory when they correspond to identification numbers of the modified summary contained in the second memory.

13. A device according to claim 12, further comprising selection means for permitting a user to select the channels for which the codes are stored in the first memory.

14. A device for filtering electronic program guide (EPG) data in a television receiver, the EPG data including a summary followed by contents, the summary indicating the code for each channel and identification numbers of data blocks of the contents, the device comprising:
a buffer memory for storing at least one data block of the contents and its identification number;
a first memory;
a channel detection device for searching television channels and storing codes for at least some of the channels received by the television receiver in the first memory;
a first comparison unit for comparing each code of the summary with the codes recorded in the first memory;
a second memory for storing a modified summary containing only the codes and identification numbers of the channels identified in the first memory; and
a second comparison unit for comparing the identification number of the data block recorded in the buffer memory with the identification numbers recorded in the second memory; and
a third memory for storing data blocks of the contents of the EPG guide data when they correspond to identification numbers of the modified summary contained in the second memory.

15. A device according to claim 14, further comprising a display for displaying television images and EPG data stored in the third memory.

16. A device according to claim 14, further comprising a microcontroller for controlling the memories and the comparison units.

17. A device according to claim 14, further comprising a selection unit for permitting a user to select the channels for which the codes are stored in the first memory.

* * * * *